United States Patent
Tekawade

(10) Patent No.: US 6,798,101 B1
(45) Date of Patent: Sep. 28, 2004

(54) SERIES CONNECTOR FOR WINDING ENDS OF A DYNAMOELECTRIC MACHINE AND ASSOCIATED METHODS

(75) Inventor: Avinash M. Tekawade, Orlando, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 0 days.

(21) Appl. No.: 10/616,440

(22) Filed: Jul. 9, 2003

(51) Int. Cl.[7] .................................................. H02K 3/46
(52) U.S. Cl. ........................................ 310/71; 310/270
(58) Field of Search .......................... 310/71, 270, 42, 310/179–180, 184, 198

(56) References Cited

U.S. PATENT DOCUMENTS

| | | | |
|---|---|---|---|
| 2,833,944 A | * 5/1958 | Willyoung | 310/61 |
| 4,289,989 A | 9/1981 | Schibline | 310/261 |
| 4,346,320 A | * 8/1982 | Davey | 310/179 |
| 4,360,750 A | * 11/1982 | Pohl | 310/54 |
| 4,486,676 A | * 12/1984 | Moore et al. | 310/52 |
| 4,563,607 A | 1/1986 | Cooper et al. | 310/260 |
| 4,646,550 A | 3/1987 | King et al. | 72/301 |
| 4,656,382 A | * 4/1987 | Moore et al. | 310/270 |
| 5,986,380 A | * 11/1999 | Kaminski et al. | 310/270 |
| 6,054,792 A | 4/2000 | Rowe et al. | 310/260 |
| 6,373,165 B1 | 4/2002 | Rowe | 310/260 |
| 6,486,575 B2 | * 11/2002 | Miller | 310/43 |
| 6,657,330 B2 | * 12/2003 | Baer et al. | 310/52 |

* cited by examiner

*Primary Examiner*—Thanh Lam

(57) ABSTRACT

A rotor winding series connector 40a is for a dynamoelectric machine, such as an exciter 25 of a generator apparatus 20 including a rotor 32 and a stator 34 surrounding the rotor. The rotor 32 may include rotor windings defining at least one pair of first and second rotor winding ends 38a, 39a arranged in spaced relation. The rotor winding series connector 40a may include a C-shaped connector body 42a including a medial connector portion 44a and respective first and second end connector portions 46a, 47a extending outwardly therefrom. The rotor winding series connector 40a may further include first and second connector brackets 48a, 49a carried by the respective first and second end connector portions 46a, 47a for receiving the respective first and second rotor winding ends 38a, 39a therein.

28 Claims, 3 Drawing Sheets

SERIES CONNECTOR FOR WINDING ENDS OF A DYNAMOELECTRIC MACHINE AND ASSOCIATED METHODS

FIELD OF THE INVENTION

The present invention relates to the field of dynamoelectric machines and, more specifically, to rotor winding series connectors for such machines.

BACKGROUND OF THE INVENTION

An electrical power generator converts mechanical energy into electrical energy. A typical electrical power generator includes a stator and a rotor that rotates within the stator to thereby generate electricity. The rotor, in turn, is mounted to a shaft that drives the rotor. An exciter may be positioned adjacent the generator to provide current to the generator rotor. The exciter generally includes an exciter stator and an exciter rotor that rotates within the exciter stator. The exciter rotor, in turn, is mounted to the shaft that drives the generator rotor. Together, the generator, shaft, and exciter may be considered as a typical generator apparatus.

An exciter is but one example of a dynamoelectric machine. Rotor windings for such a machine may be metallic bar conductors. During a winding refurbishing operation, new rotor windings are installed into the rotor body and opposing first and second rotor winding ends are connected. Referring, for example to FIG. 5, a prior art connection is shown between the opposing first and second rotor winding ends. More specifically, a plurality of first rotor winding ends 10*a*–10*n* are connected to respective second rotor winding ends 11*a*–11*n*. The first plurality of rotor winding ends 10*a*–10*n* are bent downwardly, and the second corresponding plurality of rotor winding ends 11*a*–11*n* are bent upwardly to be adjacent the first plurality of rotor winding ends in pairs. The manual bending of the rotor winding ends 10*a*–10*n*, 11*a*–11*n* may be tedious and labor intensive.

After each pair of first and second rotor winding ends 10*a*–10*n*, 11*a*–11*n* are bent to a predetermined position, a joint 14 is brazed between adjacent surface portions. Each brazed joint 14 may need to first cool before connecting successive rotor winding ends. Accordingly, the current approach to making series connections for the winding ends is relatively difficult, time consuming, and expensive.

SUMMARY OF THE INVENTION

It is therefore an object of the present invention to provide a connector for efficiently connecting rotor winding ends on a dynamoelectric machine.

This and other objects, features and advantages of the present invention are provided by a rotor winding series connector for connecting rotor winding ends. More specifically, the rotor winding series connector may be for a dynamoelectric machine comprising a rotor and a stator surrounding the rotor. The rotor may comprise rotor windings defining at least one pair of first and second rotor winding ends arranged in spaced relation. The rotor winding series connector may comprise a C-shaped connector body having a medial connector portion and respective first and second end connector portions extending outwardly from the medial connector portion.

First and second end connector brackets may be carried by the respective first and second end connector portions for receiving the respective first and second rotor winding ends. The C-shaped connector body may comprise flexible conductive material arranged in a plurality of stacked layers to facilitate installation. The series connector advantageously eliminates the need to precisely manually bend the winding ends and speeds refurbishing, for example.

The rotor winding series connector may comprise insulating material adjacent outer surface portions of the C-shaped connector body and/or the first and second connector brackets. The C-shaped connector body may comprise copper. Each of the first and second brackets may have an L-shape with a first leg extending outwardly from adjacent portions of the respective first and second end connector portions of the C-shaped connector body, and a second leg extending generally parallel thereto. The winding ends can be readily positioned into the brackets.

For a typical installation, such as a generator exciter, a plurality of pairs of first and second rotor winding ends may be connected by a plurality of rotor winding series connectors. More specifically, pluralities of first and second rotor winding ends may be arranged in respective stacks, and a rotor winding series connector may connect each pair of first and second rotor winding ends. Spacing between successive pairs of the first and second rotor winding ends may progressively increase. Accordingly, successive ones of the plurality of rotor winding series connectors may have respective medial portions having progressively increasing lengths corresponding to the progressively increasing spacings. A respective brazed joint may be provided between each of the C-shaped connector bodies and adjacent portions of each of the first and second rotor winding ends.

A method aspect of the present invention is directed to using the rotor winding series connector to connect, in series, at least one pair of first and second rotor winding ends arranged on the rotor in spaced relation. The method may comprise positioning the respective first and second rotor winding ends into the respective first and second connector brackets to thereby connect the respective first and second rotor winding ends together in series. The method may also comprise selecting the rotor winding series connector so that the medial connector portion has a length corresponding to the space between the rotor winding ends. The method may further comprise brazing a respective joint between the C-shaped connector body and adjacent portions of the first and second rotor winding ends.

DETAILED DESCRIPTION OF THE PREFERRED EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
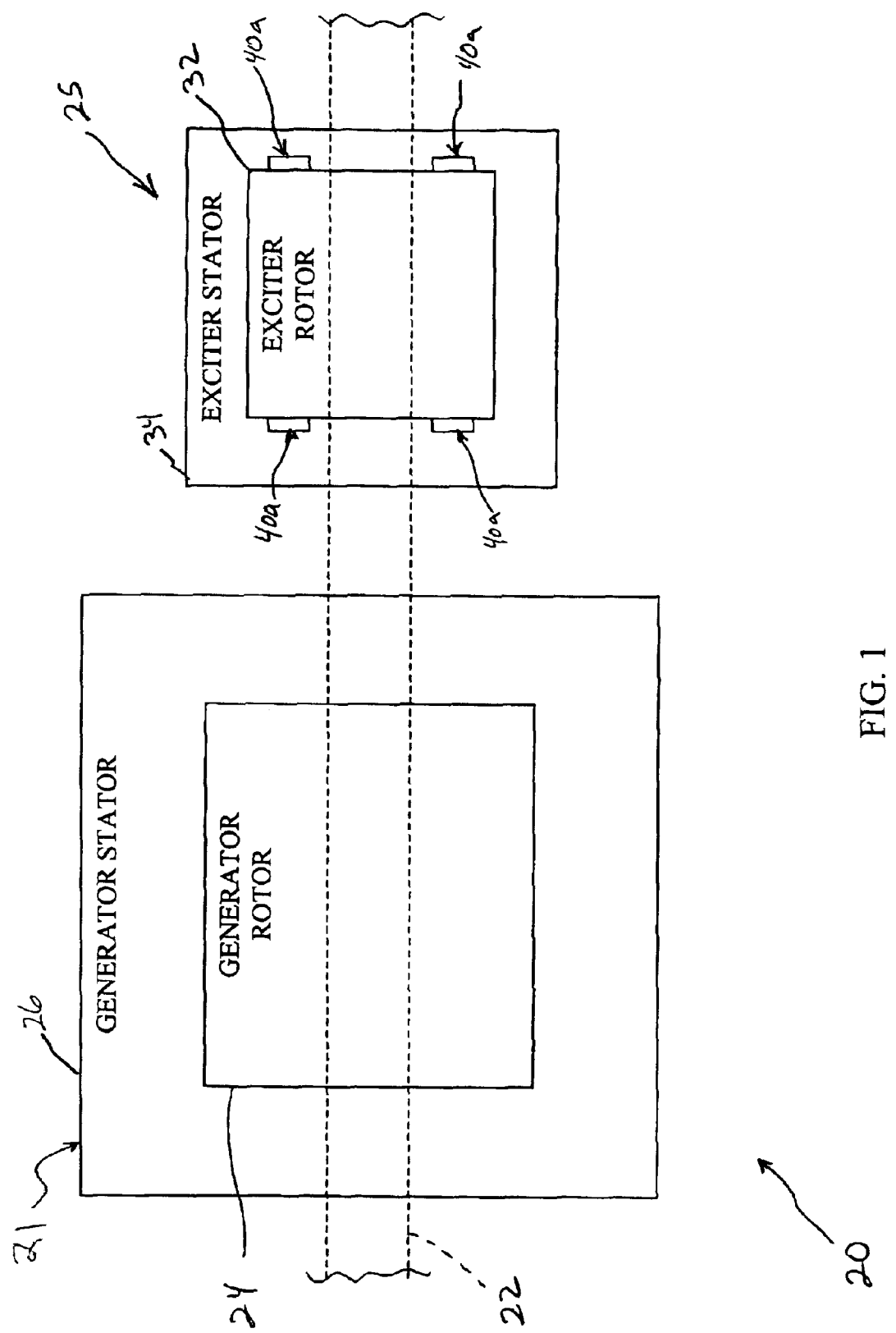
FIG. 1 is a schematic diagram of a generator apparatus including series connectors for winding ends of an exciter according to the present invention.

Referring initially to FIG. 1, a generator apparatus 20 including a rotor winding series connector 40a in accordance with the present invention is now described. The generator apparatus 20 illustratively includes a generator 21 comprising a shaft 22, and a generator rotor 24 carried by the shaft. A generator stator 26 illustratively surrounds the generator rotor 24. More specifically, the generator rotor 24 rotates within the generator stator 26 to generate electricity. The shaft 22 may be rotated by mechanical energy provided by a steam, water, or combustion turbine, for example, as will be appreciated by those skilled in the art.

The generator apparatus 20 also illustratively includes an exciter 25, which is but one example of a dynamoelectric machine. The exciter 25 illustratively comprises an exciter rotor 32 carried by the shaft 22, and an exciter stator 34 surrounding the exciter rotor. The exciter 25 supplies electrical power for the generator rotor 24 as will be understood by those skilled in the art.

Figure 2:
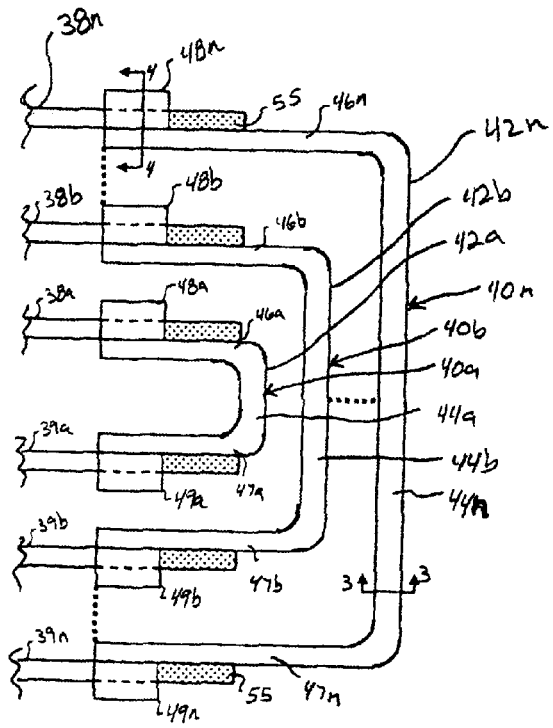
FIG. 2 is a schematic side elevation view of a plurality of rotor winding series connectors according to the present invention with the insulation removed for clarity of illustration.
Figure 3:
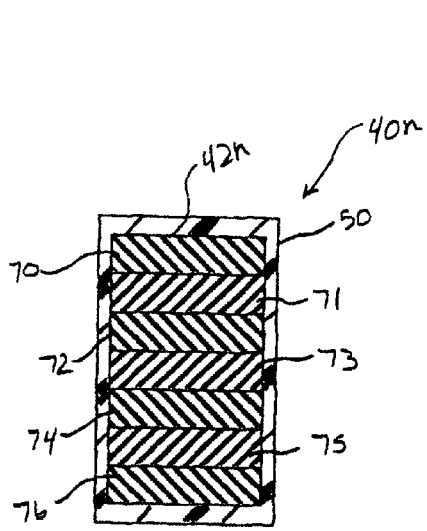
FIG. 3 is a cross sectional view taken through line 3—3 of FIG. 2.
Figure 4:
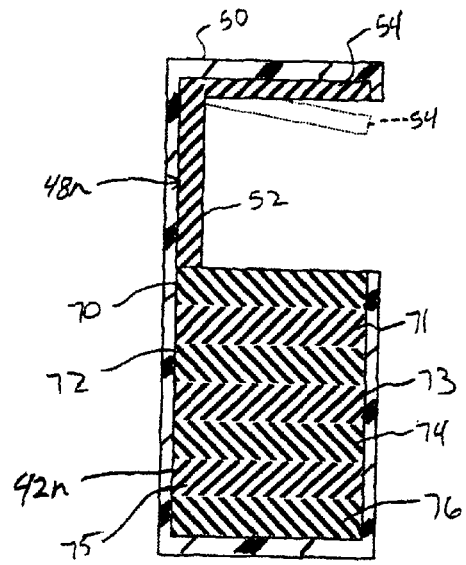
FIG. 4 is a cross sectional view taken through line 4—4 of FIG. 2 with the winding end removed for clarity of illustration.
Figure 5:
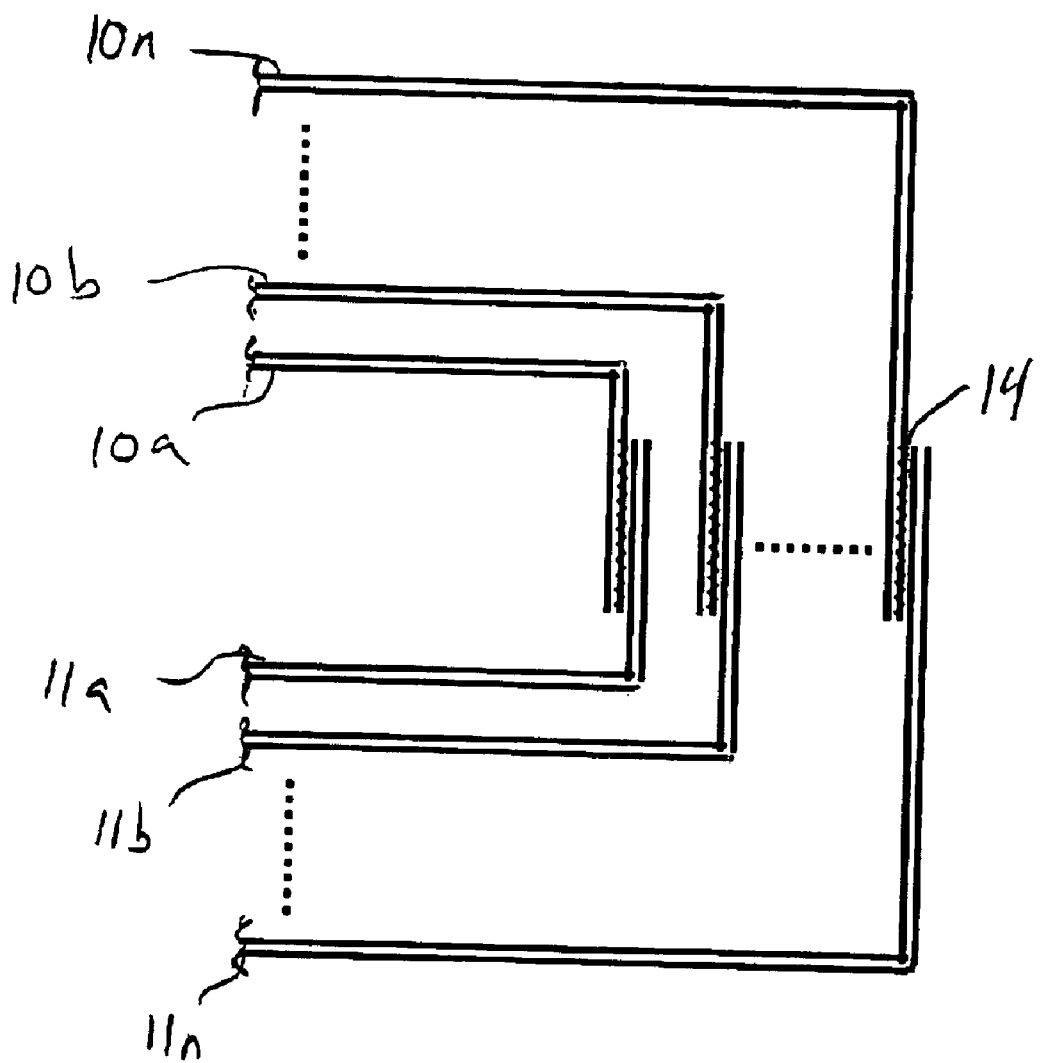
FIG. 5 is a schematic side elevation view of a plurality of rotor winding ends connected according to the prior art.

Referring now additionally to FIGS. 2–4, the exciter rotor 32 illustratively comprises rotor windings defining pairs of first rotor winding ends 38a–38n and second rotor winding ends 39a–39n arranged in spaced relation. The rotor windings may comprise a metallic bar conductor, such as copper, for example, or another type of metallic conductor, as understood by those skilled in the art. The metallic bar conductor may be between about 1.5 to 2.5 inches wide by about 0.25 to 0.75 inches thick, but may be any size, as understood by those skilled in the art. The spaced relation between the rotor winding ends 38a–38n, 39a–39n is illustratively a radially spaced relation.

Each rotor winding series connector 40a–40n illustratively connects the pair of rotor winding ends 38a–n, 39a–n together in series. Each rotor winding series connector 40a–40n illustratively has a C-shaped connector body 42a–42n having a medial connector portion 44a–44n, a first end connector portion 46a–46n, and a second end connector portion 47a–47n, both of which extend outwardly from the medial connector portion. Each rotor winding series connector 40a–40n also illustratively includes first connector brackets 48a–48n and second connector brackets 49a–49n carried by the respective first and second end connector portions 46a–46n, 47a–47n. The first and second end connector brackets 48a–48n, 49a–49n illustratively receive the respective first and second rotor winding ends 38a–38n, 39a–39n therein. A brazed joint or weld 55 is provided between each of the rotor winding ends 38a–38n, 39a–39n, and adjacent portions of the rotor winding series connectors 40a–40n.

The plurality of first rotor winding ends 38a–38n and second rotor winding ends 39a–39n are each illustratively arranged in stacked relation. Accordingly, a corresponding plurality of rotor winding series connectors 40a–40n connects each pair of the first and second rotor winding ends 38a–38n, 39a–39n. Although a plurality of rotor winding series connectors 40a–40n connecting a plurality of first and second rotor winding ends 38a–38n, 39a–39n, are illustrated, those skilled in the art will appreciate that for some embodiments only, one rotor winding series connector may be provided to connect a single pair of first and second rotor winding ends. Those skilled in the art will further appreciate that the rotor winding series connectors 40a–40n may be used on any dynamoelectric machine, especially larger dynamoelectric machines where considerable labor may be required to bend rotor windings.

The plurality of first and second rotor winding ends 38a–38n, 39a–39n, illustratively defines progressively increasing spacings therebetween. The progressively increasing spacings between the plurality of first and second rotor end windings 38a–38n, 39a–39n are progressively increasing radial spacings. The respective medial connector portions 44a–44n of the plurality of rotor winding series connectors 40a–40n have progressively larger lengths to correspond to the progressively increasing radial spacings.

Insulating material 50 (FIGS. 3–4) is positioned between adjacent ones of the plurality of first rotor end windings 38a–38n, the second rotor end windings 39a–39n, and between adjacent ones of the plurality of rotor winding series connectors 40a–40n. The rotor windings are illustrated in FIG. 2 as being spaced apart, but those skilled in the art will appreciate that very little, if any, space is provided between the rotor windings after the insulating material 50 is applied to the first and second rotor end windings 38a–38n, 39a–39n, and the rotor winding series connectors 40a–40n. Insulating material 50 is also illustratively positioned adjacent outer surface portions of the C-shaped connector body 42a–42n, and/or the first and second connector brackets 48a–48n. The insulating material 50 may, for example, be a plastic material, or any other type of insulator.

Referring now more specifically to FIGS. 3–4, one of the rotors winding series connectors 40n will be described in greater detail, for clarity of explanation. It should be readily understood by those skilled in the art, however, that the following description of the rotor winding series connector is applicable to all the rotor winding series connectors illustrated in FIG. 2, for example. The C-shaped connector body 42n comprises conductive material that is preferably flexible. The conductive material illustratively comprises a plurality of stacked metal layers 70–76. Each of the stacked metal layers 70–76 may, for example, be copper, or another flexible conductive material, as understood by those skilled in the art. More specifically, the stacked metal layers 70–76 are moveable with respect to one another, to advantageously increase flexibility. Although the stacked metal layers 70–76 are movable with respect to one another, they are preferably connected along an end portion by a brazed or spot welded joint, for example, or any other type of joint. A total of seven stacked metal layers 70–76 are illustrated, but those skilled in the art will appreciate that any number of metal layers may be used to form the C-shaped connector body 42n.

The connector bracket 48n illustratively has an L-shape. An end portion of the connector bracket 48n is connected to an adjacent portion of the C-shaped connector body 42n. The connector bracket 48n may be connected to the C-shaped connector body 42n by a brazed joint, a spot welded joint, or any other type of joint, as understood by those skilled in the art. More specifically, the connector bracket 48n has a first leg 52 extending outwardly from adjacent portions of the end connector portion 46n of the C-shaped connector body 42n. The connector bracket 48n also illustratively has a second leg 54 extending generally parallel to the end connector portion 46n of the C-shaped connector body 42n. The second leg 54 may be angled inwardly (illustrated by a dashed line) towards the end connector portion 46n to advantageously provide a more sturdy connection between the rotor winding series connector 40*n* and the rotor winding end. Those skilled in the art will appreciate that the angle of the second leg 54 may vary depending on the size of the rotor end windings to be secured therein.

A method aspect for the present invention is for using a rotor winding series connector 40*a*–40*n* to connect in series at least one pair of first and second rotor winding ends 38*a*–38*n*, 39*a*–39*n*. The method may comprise positioning the respective first and second rotor winding ends 38*a*–38*n*, 39*a*–39*n* into the respective first and second connector brackets 48*a*–48*n*, 49*a*–49*n* to thereby connect the respective first and second rotor winding ends together in series.

The method may also includes selecting the rotor winding series connector 40*a*–40*n* so that the medial connector portion 44 has a length corresponding to the space between the rotor winding ends 38*a*, 38*b*. The method further includes brazing at least one joint 55 between the C-shaped connector body 42*a*–42*n* and adjacent portions of the first and second rotor winding ends 38*a*–38*n*, 39*a*–39*n*.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A dynamoelectric machine comprising:
a rotor and a stator surrounding said rotor;
said rotor comprising rotor windings defining at least one pair of first and second rotor winding ends arranged in spaced relation; and
at least one rotor winding series connector connecting said at least one pair of first and second rotor winding ends together in series and comprising
a C-shaped connector body having a medial connector portion and respective first and second end connector portions extending outwardly therefrom, and
first and second connector brackets carried by the respective first and second end connector portions and receiving the respective first and second rotor winding ends therein.

2. A dynamoelectric machine according to claim 1 wherein said at least one pair of first and second rotor winding ends comprises a plurality of first rotor winding ends arranged in stacked relation and a plurality of second rotor winding ends arranged in stacked relation; and wherein said at least one rotor winding series connector comprises a corresponding plurality thereof with one rotor winding series connector for each pair of first and second rotor winding ends.

3. A dynamoelectric machine according to claim 2 wherein successive pairs of said plurality of first and second rotor winding ends define progressively increasing spacings therebetween; and wherein successive ones of said plurality of rotor winding series connectors have respective medial connector portions having progressively increasing lengths to correspond to the progressively increasing spacings.

4. A dynamoelectric machine according to claim 2 further comprising insulating material between adjacent ones of said plurality of first rotor end windings, between adjacent ones of said plurality of second rotor end windings, and between adjacent ones of said plurality of rotor winding series connectors.

5. A dynamoelectric machine according to claim 1 wherein said C-shaped connector body comprises a flexible conductive material.

6. A dynamoelectric machine according to claim 5 wherein said flexible conductive material comprises a plurality of stacked metal layers.

7. A dynamoelectric machine according to claim 6 wherein each of said stacked metal layers comprises copper.

8. A dynamoelectric machine according to claim 1 wherein said at least one rotor winding series connector further comprises insulating material adjacent outer surface portions of at least one of said C-shaped connector body and said first and second connector brackets.

9. A dynamoelectric machine according to claim 1 wherein said at least one rotor winding series connector further comprises a respective brazed joint between said C-shaped connector body and adjacent portions of said first and second rotor winding ends.

10. A dynamoelectric machine according to claim 1 wherein each of said first and second connector brackets has an L-shape with a first leg extending outwardly from adjacent portions of said respective first and second end connector portions of said C-shaped connector body and a second leg extending generally parallel thereto.

11. A dynamoelectric machine according to claim 1 wherein each rotor winding comprises a metallic bar conductor.

12. A rotor winding series connector for a dynamoelectric machine comprising a rotor and a stator surrounding the rotor, the rotor comprising rotor windings defining at least one pair of first and second rotor winding ends arranged in spaced relation, the rotor winding series connector comprising:
a C-shaped connector body comprising flexible conductive material arranged in a plurality of stacked layers to define a medial connector portion and respective first and second end connector portions extending outwardly therefrom; and
first and second connector brackets carried by the respective first and second end connector portions and for receiving the respective first and second rotor winding ends therein.

13. A rotor winding series connector according to claim 12 further comprising insulating material adjacent outer surface portions of at least one of said C-shaped connector body and said first and second connector brackets.

14. A rotor winding series connector according to claim 12 wherein said C-shaped connector body comprises copper.

15. A rotor winding series connector according to claim 12 wherein each of said first and second connector brackets has an L-shape with a first leg extending outwardly from adjacent portions of said respective first and second end connector portions of said C-shaped connector body and a second leg extending generally parallel thereto.

16. A generator apparatus comprising:
a shaft;
a generator rotor carried by said shaft, and a generator stator surrounding said generator rotor;
an exciter rotor carried by said shaft, and an exciter stator surrounding said exciter rotor;
said exciter rotor comprising rotor windings defining at least one pair of first and second rotor winding ends arranged in spaced relation, and at least one rotor winding series connector connecting said at least one pair of first and second rotor winding ends together in series and comprising
a C-shaped connector body having a medial connector portion and respective first and second end connector portions extending outwardly therefrom, and first and second connector brackets carried by the respective first and second end connector portions and receiving respective first and second rotor winding ends therein.

17. A generator apparatus according to claim 16 wherein said at least one pair of first and second rotor winding ends comprises a plurality of first rotor winding ends arranged in stacked relation and a plurality of second rotor winding ends arranged in stacked relation; and wherein said at least one rotor winding series connector comprises a corresponding plurality thereof with one rotor winding series connector for each pair of first and second rotor winding ends.

18. A generator apparatus according to claim 17 wherein said plurality of first and second rotor winding ends define progressively increasing spacings therebetween; and wherein said plurality of rotor winding series connectors have respective medial connector portions having progressively increasing lengths to correspond to the progressively increasing spacings.

19. A generator apparatus according to claim 17 further comprising insulating material between adjacent ones of said plurality of first rotor end windings, between adjacent ones of said plurality of second rotor end windings, and between adjacent ones of said plurality of rotor winding series connectors.

20. A generator apparatus according to claim 16 wherein said C-shaped connector body comprises a flexible conducive material.

21. A generator apparatus according to claim 20 wherein said flexible conductive material comprises a plurality of stacked metal layers.

22. A generator apparatus according to claim 21 wherein each of said stacked metal layers comprises copper.

23. A generator apparatus according to claim 16 wherein said at least one rotor winding series connector further comprises insulating material adjacent outer surface portions of at least one of said C-shaped connector body and said first and second connector brackets.

24. A generator apparatus according to claim 16 wherein said at least one rotor winding series connector further comprises a respective brazed joint between said C-shaped body and adjacent portions of said first and second rotor winding ends.

25. A generator apparatus according to claim 16 wherein each of said first and second connector brackets has an L-shape with a first leg extending outwardly from adjacent portions of said respective first and second end connector portions of said C-shaped connector body and a second leg extending generally parallel thereto.

26. A method for using a rotor winding series connector to connect in series at least one pair of first and second rotor winding ends arranged on a rotor in spaced relation, the rotor winding series connector comprising a C-shaped connector body having a medial connector portion and respective first and second end connector portions extending outwardly therefrom, and first and second connector brackets carried by the respective first and second end connector portions, the method comprising:

positioning the respective first and second rotor winding ends into the respective first and second connector brackets to thereby connect the respective first and second rotor winding ends together in series.

27. A method according to claim 26 further comprising selecting the rotor winding series connector so that the medial connector portion has a length corresponding to the space between the rotor winding ends.

28. A method according to claim 26 further comprising brazing a respective joint between the C-shaped connector body and adjacent portions of the first and second rotor winding ends.

* * * * *